: 2,875,026
Patented Feb. 24, 1959

2,875,026

PRECIPITATION METHOD OF SEPARATING PLUTONIUM FROM CONTAMINATING ELEMENTS

Robert B. Duffield, Champaign, Ill., assignor to the United States of America as represented by the United States Atomic Energy Commission No Drawing. Application July 17, 1947
Serial No. 761,746

15 Claims. (Cl. 23—14.5)

This invention relates to a process for separating plutonium from elements normally associated with plutonium in a neutron-irradiated uranium mass, and to a new plutonium-containing composition, which is employed in said process.

Reference herein to any of the elements is to be understood as denoting the element generically whether in its free state or in the form of a compound, unless otherwise indicated by the context.

Plutonium is normally produced by the interaction of uranium with neutrons. A neutron is captured by a $U^{238}$ atom to form $U^{239}$ which decays with a half-life of 23 minutes to $Np^{239}$, which in turn decays with a half-life of 2.3 days to $Pu^{239}$. The neutrons also react with $U^{235}$ to produce nuclear fission and two fragments called fission fragments which undergo radioactive disintegration into chains of two groups, a light group of elements with numbers from 35 to 45 and a heavy group with atomic numbers from 51 to 60. These elements either alone or combined as compounds are known as fission products. It will be readily apparent that plutonium as produced by the bombardment of uranium is always associated with uranium, neptunium and radioactive fission products.

The principal object of this invention is to provide a method for separating plutonium from elements, such as uranium, neptunium, yttrium and other elements of the yttrium sub-group of rare earth metals, commonly found with plutonium in an irradiated uranium mass.

An additional object of this invention is to provide a new composition of matter containing plutonium, which is relatively insoluble in an aqueous solution, and a method of preparing the same.

I have discovered that plutonium ions, having a valence less than five, will form a double salt with potassium and sulfate ions. This salt, potassium plutonium sulfate, is quite insoluble in an aqueous medium. For example, the solubility of potassium plutonium sulfate in a saturated aqeous solution of $K_2SO_4$ is approximately 20 mg. per liter. I have further discovered that the compound formed by neptunium ions with potassium ions and sulfate ions is quite soluble in aqueous solution. It has long been known that uranyl ions, and elements of the yttrium sub-group of rare earths form water-soluble salts with potassium sulfate in an aqueous solution. Because of the difference in solubilities of the compounds formed with potassium sulfate by plutonium and neptunium, uranium, yttrium and other elements of the yttrium group of rare earths, plutonium may be readily separated from these contaminating elements, by forming potassium plutonium sulfate in a solution containing plutonium and any or all of these elements.

Broadly, the process of this invention comprises the separation of plutonium from aqueous solutions and from these contaminating elements by contacting plutonium ions in a valence state less than five, and ions of any of these aforementioned contaminants, with potassium and sulfate ions, in an aqueous medium with a pH of less than about 7.1, thus forming a precipitate of potassium plutonium sulfate, and separating said precipitate from the aqueous medium.

In order to separate plutonium, and contaminating elements which form a water-soluble double salt from potassium ions and sulfate ions, plutonium and these contaminants are dissolved in a water solution. Where plutonium and the contaminants are present as compounds insoluble in water, these compounds may be dissolved first in a suitable acid and the solution may then be diluted to form a solution only slightly acid.

The plutonium and contaminating ions contained in an aqueous solution are contacted with a soluble potassium salt and a soluble sulfate salt. This may be carried out conveniently by introducing an aqueous potassium sulfate solution into the solution containing the plutonium and contaminating ions. Alternatively, it may be accomplished by introducing a water-soluble mixture of the salts of plutonium and contaminants into a potassium sulfate solution. The solution from which the precipitation is made should have a pH less than about 7.1, since in an alkaline solution precipitation of insoluble hydroxides would tend to interfere with this process. The precipitation may be effected at room temperatures, but it has been found that if the solution containing the ions of plutonium, potassium, sulfate and contaminating elements is digested at elevated temperatures, such as 70 to 95° C., for a short time, the efficiency of the separation is increased. The precipitate of potassium plutonium sulfate this formed may be separated by any of the usual methods such as decantation, filtration, or centrifugation.

Separation of plutonium from yttrium is illustrated by the following example.

Example I

One-tenth ml. of 10% $K_2SO_4$ solution was added to 0.05 ml. of $Pu^{+4}$ sulfate solution containing 1.8 mg. of plutonium in dilute sulfuric acid. 2.8 mg. of yttrium sulfate and 0.02 ml. of methyl alcohol were added to the solution. The solution was then heated for 10 minutes at 95° C. A light pink precipitate formed which on standing for a few minutes changed to green. This was separated from the solution by filtering and the precipitate was analyzed by the counter technique. This analysis showed that the precipitate contained 95% of the plutonium and less than 1% of the yttrium.

In a neutron-irradiated uranium mass, as it is usually made by a chain reaction in a pile, the concentration of plutonium is so low in the neutron-irradiated uranium mass that solutions of components of this mass contain the plutonium in concentrations below the limit of solubility of potassium plutonium sulfate. In this case, it is necessary to separate the plutonium from such solutions by employing a carrier precipitate to remove the plutonium from the solution. An insoluble carrier may be introduced into the solution as a preformed finely divided solid but is preferably precipitated directly in the solution from which the plutonium is to be carried. The mechanism of the carrying of plutonium from solution is not fully understood but it is believed to be effected in some cases by incorporation of plutonium ions into the carrier crystal lattice, in some cases by surface adsorption of plutonium ions, and in some cases by a combination of both. Potassium lanthanum sulfate and potassium thorium sulfate have been found to be useful carriers for the separation of quadrivalent or trivalent plutonium from neptunium, yttrium and other fission products by the process of this invention.

In order to separate plutonium from an aqueous solution by precipitation of potassium plutonium sulfate, it is necessary that the plutonium be in the reduced oxidation state, i. e., that plutonium have either a valence of $+3$ or $+4$. Plutonium in its highest oxidation state, i. e., $Pu^{+6}$ is soluble in a potassium sulfate solution. Any of the reducing agents ordinarily used, such as $Fe^{+2}$, $SO_3^{--}$, hydroxylamine, $H_2O_2$, and $C_2O_4^{--}$, may be used to reduce the plutonium and maintain it in the reduced state while precipitation of the plutonium from the potassium sulfate solution is being effected. The use of reducing agents to maintain plutonium in the reduced state will not affect the process for the separation of plutonium from neptunium, yttrium and the yttrium rare earth group metals, since neptunium does not form a precipitate with potassium sulfate in either the reduced or the oxidized state and yttrium and the yttrium group of rare earth metals have only a single valence state.

The use of the aforementioned reducing agents will not cause reduction of the uranyl ion in solution. The quadrivalent uranium ion is a strong reducing agent and therefore the uranyl ion requires a stronger reducing agent than those mentioned to bring about reduction to the quadrivalent uranium ion. In addition, uranyl and sulfate ions form a strong undissociated complex and this complex formation also tends to maintain the uranium in solution in this separation process.

While the use of reducing agents may be preferable in order to insure that all of the plutonium ions are in the reduced state, it has been found that potassium sulfate solution has some reducing action and will tend to maintain the plutonium ions in the reduced state without any other reducing agent present. Thus, quantitative separations of plutonium in its $+3$ or $+4$ state may be effected where no reducing agents are added to the solution.

It is preferable to precipitate the potassium plutonium sulfate, either with or without a carrier, from a solution containing an excess of potassium and sulfate ions over the stoichiometric proportions for precipitation, and very efficient precipitations have been obtained when the solution was nearly saturated with potassium sulfate. Precipitation of the potassium plutonium sulfate with a carrier of potassium lanthanum or potassium thorium sulfate will take place at room temperature, but it has been found that digestion at elevated temperatures will cause the precipitate to form faster than at the lower temperatures. When potassium lanthanum sulfate is used as the carrier, precipitation should always be carried out in solution at elevated temperatures, since potassium lanthanum sulfate is somewhat soluble in cold water.

Now that the method of separating plutonium from neptunium, uranium, yttrium and the yttrium rare earth group metals by means of a carrier has been described, the following examples will show the efficiency of the aforementioned carriers for the separation of plutonium and neptunium.

*Example II*

Five-tenths mg. of $La^{+3}$ as the nitrate and a quantity of plutonium sulfate sufficient to furnish 330 alpha counts per minute were added to 6 cc. of a saturated potassium sulfate solution. One-sixth cc. of 6 N $HNO_3$ was then added to make the solution approximately .1 N in $H^+$. The solution was then heated for 10 minutes at 95° C. and the precipitate which formed was separated from the solution by centrifugation and washed twice with dilute potassium sulfate solution. The precipitate was analyzed for plutonium by the counting method and it was found that 95.4% of the plutonium had carried with the precipitate. This experiment was repeated with identical quantities of material except that neptunium sulfate was substituted for plutonium sulfate. Counter analysis showed that less than 1% of the neptunium was carried from solution.

An additional example showing the carrying power of potassium thorium sulfate for quadrivalent plutonium was carried out as follows.

*Example III*

One-half mg. of $Th^{+4}$ as the nitrate and a quantity of $Pu^{+4}$ equal to 330 alpha counts per minute as the sulfate were added to 6 cc. of saturated potassium sulfate solution. The solution was then made slightly acid by adding one-sixth cc. of 6 N $HNO_3$ and then digested for ten minutes at 95° C. The precipitate which formed was centrifuged out and washed twice with dilute $K_2SO_4$ solution. The precipitate was anlyzed for plutonium by the counter technique and it was found that the precipitate contained 88% of the original plutonium. A similar test of the carrying power of potassium thorium sulfate for neptunium disclosed that the potassium thorium sulfate carried only 6% of the neptunium from solution.

Perhaps the more important embodiment of this process is the separation of plutonium from uranium. As described above, plutonium is usually formed by the neutron irradiation of uranium and the normal neutron-irradiated uranium mass contains a very large proportion of uranium to a very minute part of plutonium, often of the order of 1 metric ton of uranium to 250 g. of plutonium. Separation of plutonium from uranium is, therefore, a very important element of plutonium production.

The following example will illustrate the carrying power of potassium lanthanum sulfate for quadrivalent plutonium ions contained in a solution which also contains uranyl ions.

*Example IV*

An aqueous solution was formed by dissolving 3 mg. of lanthanum as the nitrate, 20 microliters of plutonium as the nitrate, 3 ml. of 20% uranyl nitrate solution and 1 g. of potassium sulfate. The total volume of this solution amounted to 3.32 ml. The 20 microliter sample of plutonium was estimated by precipitation and counter analysis to contain about 2,450 alpha counts per minute. The amount of potassium sulfate used was sufficient to saturate the total volume of solution formed. The solution was heated to 95° C. and maintained at this temperature for ten minutes. The precipitate which was formed during this digestion period was separated by decantation. The precipitate was found to contain 2280 alpha counts per minute with 120 alpha counts remaining in the supernatant liquid. This process, therefore, effected the separation of 93% of the plutonium.

The new composition of matter, potassium plutonium sulfate may be prepared by contacting an aqueous solution containing quadrivalent plutonium ions with potassium sulfate. A pink precipitate of $Pu(SO_4)_2.4H_2O$ may form at first, but upon standing this precipitate will change to the green potassium plutonium sulfate complex salt. A small amount of methyl alcohol may also be added to the solution to further decrease the solubility of the potassium plutonium sulfate precipitate. The small crystals of this salt are light green but the larger ones are a darker green. The crystals appear to be triclinic. The crystals are usually either anhydrous or a monohydrate, and analysis of the compound shows that it has the composition $K_4Pu(SO_4)_4$. The solubility of this compound has been determined to be 0.02 gram of plutonium per liter in a concentrated potassium sulfate solution. The following example illustrates a method of preparation.

*Example V*

One-tenth ml. of 10% $K_2SO_4$ solution was added to 0.05 mg. of $Pu^{+4}$ sulfate solution containing 1.8 mg. of plutonium in dilute sulfuric acid. 0.02 ml. of methyl alcohol was then added to this solution and the solution was heated for 10 minutes at 95° C. A light pink precipitate of $Pu(SO_4)_2.4H_2O$ formed first but on standing changed to the green $K_4Pu(SO_4)_4$.

While the process of our invention may be used very satisfactorily to separate plutonium from solution or from neptunium, yttrium, and the yttrium rare earth fission products, it also may be employed in the concentration of plutonium and such separation processes as the bismuth phosphate-lanthanum fluoride process. Numerous other modifications are also possible. Changes, therefore, may be made without departing from the spirit and scope of the invention as described in the appended claims in which it is the intention to claim all novelty and invention as broadly as possible in view of the prior art.

What is claimed is:

1. A method of separating plutonium in a valence state of less than five dissolved in an aqueous solution, from said solution, which comprises contacting said solution with water-soluble potassium and sulfate compounds while maintaining the solution at a pH of less than about 7.1, and isolating the precipitate of potassium plutonium sulfate thus formed.

2. A method of separating plutonium from contaminating elements which form water-soluble double salts with potassium ions and sulfate ions, which comprises reacting together in an aqueous medium having a pH of less than about 7.1, a mixture in the ionic state of plutonium in a valence state less than five and at least one of said contaminating elements, with ions of potassium and sulfate in sufficient concentration to form a precipitate of potassium plutonium sulfate, and isolating said precipitate.

3. The process of claim 2 wherein the contaminating ions are uranyl ions.

4. The process of claim 2 wherein the contaminating ions are neptunium ions.

5. The process of claim 2 wherein the contaminating ions are ions of an element of the yttrium sub-group of rare earths.

6. A method of separating plutonium from contaminating elements which form water-soluble double salts with potassium ions and sulfate ions, which comprises reacting together in an equeous medium having a pH of less than about 7.1, a mixture in the ionic state of plutonium in a valence state less than five and at least one of said contaminating elements, with ions of potassium, lanthanum and sulfate in sufficient concentration to form a carrier precipitate of potassium lanthanum sulfate containing plutonium, and isolating said precipitate.

7. The process of claim 6 wherein the contaminating element is neptunium.

8. The process of claim 6 wherein the contaminating element is uranium.

9. The process of claim 6 wherein the contaminating element is an element of the yttrium sub-group of rare earths.

10. A method of separating plutonium from contaminating elements which form water-soluble double salts with potassium ions and sulfate ions, which comprises reacting together in an aqueous medium having a pH less than about 7.1, a mixture in the ionic state of plutonium in a valent state less than five and at least one of said contaminating elements, with ions of potassium, thorium and sulfate in sufficient concentration to form a carrier precipitate of potassium thorium sulfate containing plutonium, and isolating said precipitate.

11. The process of claim 10 wherein the contaminant is uranium.

12. The process of claim 10 wherein the contaminant is neptunium.

13. The process of claim 10 wherein the contaminant is a member of the yttrium subgroup of rare earths.

14. A method of forming potassium plutonium sulfate, which comprises contacting an equeous potassium sulfate solution with a water-soluble plutonium salt.

15. A method of forming potassium plutonium sulfate which comprises contacting an aqueous potassium sulfate solution, said solution having a pH less than about 7.1 with a water-soluble plutonium salt and digesting said solution at an elevated temperature until a precipitate of potassium plutonium sulfate forms.

References Cited in the file of this patent

UNITED STATES PATENTS 2,785,951   Thompson et al. _____ Mar. 19, 1957

OTHER REFERENCES

Mellor: "Comprehensive Treatise on Inorganic and Theoretical Chemistry," vol. 5, page 662 (1924); vol. 12, page 103 (1932); vol. 7, pages 159, 246 (1926); Longmans, Green & Co., N. Y. C.

Friend: "Textbook of Inorganic Chemistry," vol. 7, pt. 3, page 319 (1926); Charles Griffin & Co., Ltd., London.

Anderson; Paper 6.2 in "The Transuranium Elements," by Seaborg et al. Vol. 14B, part I, pp. 724–728—stated on page 724 to be from preliminary reports on Metallurgical Project Reports CN–3001 (May 1945) and CN–3053 (June 1945).

Cefola et al.: Reported in CN–405, pp. 15, 16, December 31, 1942, and Ames Project Report, reported in CN–1503, page 29, June 10, 1944, as reported by AEC Document MUC–GTS–2148 (N–2205), January 16, 1946, pages 1, 1 (Table 1), 13, 14, 20, 40, Declassified November 22, 1957. (Copy available from U. S. Atomic Energy Comm., Classified Technical Lib.)